United States Patent
Nielsen et al.

(10) Patent No.: US 12,009,872 B2
(45) Date of Patent: Jun. 11, 2024

(54) UPLINK OPERATION

(71) Applicant: NOKIA TECHNOLOGIES OY, Espoo (FI)

(72) Inventors: Kim Nielsen, Storvorde (DK); Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 17/644,727

(22) Filed: Dec. 16, 2021

(65) Prior Publication Data
US 2022/0200707 A1 Jun. 23, 2022

(30) Foreign Application Priority Data
Dec. 21, 2020 (FI) ...................................... 20206345

(51) Int. Cl.
*H04B 7/06* (2006.01)
*H04B 17/10* (2015.01)
*H04B 17/382* (2015.01)

(52) U.S. Cl.
CPC ......... *H04B 17/103* (2015.01); *H04B 17/382* (2015.01)

(58) Field of Classification Search
CPC .. H04B 17/103; H04B 17/382; H04B 7/0404; H04B 7/0691; H04B 7/0608;
(Continued)

(56) References Cited

U.S. PATENT DOCUMENTS

2009/0186622 A1 7/2009 Karabinis
2011/0103273 A1 5/2011 Dutta
(Continued)

FOREIGN PATENT DOCUMENTS

CA 2531551 A1 6/2007
CN 101981822 A 2/2011
(Continued)

OTHER PUBLICATIONS

Office Action and Search Report for Finnish Application No. 20206345, dated Apr. 12, 2021, 9 pages.
(Continued)

*Primary Examiner* — Quoc Thai N Vu
(74) *Attorney, Agent, or Firm* — Brake Hughes Bellermann LLP

(57) ABSTRACT

A method comprising securing orientation of a first type of an antenna and a second type of an antenna, wherein the first type of an antenna and the second type of an antenna are comprised in a terminal device, determining if the terminal device is radio resource control connected to a cell provided by an access node comprised, at least partly, in a satellite or relayed through the satellite, and if it is, estimating a link loss based, at least partly, on downlink receive measurements obtained using the first type of an antenna, determining an uplink link budget based on the estimated link loss, determining if the uplink link budget is greater than a threshold for a transmit antenna, wherein the transmit antenna is the first type of the antenna or the second type of an antenna, and attempting a transmission to the access node using the transmit antenna if the uplink link budget is greater than the threshold for the transmission antenna.

20 Claims, 12 Drawing Sheets

(58) Field of Classification Search
CPC .. H04B 7/0802; H04B 7/0805; H04B 7/0817; H04B 7/0825; H04B 7/0874; H04B 7/15507; H04B 7/18508; H04B 7/1851; H04B 7/18517; H04B 7/2041; H04L 5/00; H04W 36/14; H04W 52/242; H04W 84/06

See application file for complete search history.

(56) References Cited

U.S. PATENT DOCUMENTS

| | | | |
|---|---|---|---|
| 2014/0376455 A1 | 12/2014 | Autti et al. | |
| 2016/0119938 A1* | 4/2016 | Frerking | H04B 7/15507 370/316 |
| 2016/0128004 A1 | 5/2016 | Lee et al. | |
| 2016/0374047 A1* | 12/2016 | Reis | H04B 7/18513 |
| 2018/0054772 A1* | 2/2018 | Tan | H04W 40/12 |
| 2018/0375571 A1* | 12/2018 | Chin | H04W 36/30 |
| 2020/0112926 A1 | 4/2020 | Laghate et al. | |
| 2020/0382978 A1 | 12/2020 | Manolakos et al. | |

FOREIGN PATENT DOCUMENTS

| | | |
|---|---|---|
| CN | 110771216 A | 2/2020 |
| CN | 111510935 A | 8/2020 |
| WO | 2007071059 A1 | 6/2007 |

OTHER PUBLICATIONS

ETSI TR 102 058, V1.1.1; "Satellite Earth Stations and Systems (SES); Satellite Component of UMTS/IMT-2000; Evaluation of the W-CDMA UTRA FDD as a Satellite Radio Interface", November, 154 pages.

European Search Report for Application No. 21214308.5, dated May 16, 2022, 9 pages.

Office Action and Search Report for Chinese Application No. 202111564899.6, mailed on Feb. 23, 2024, 8 pages.

* cited by examiner

UPLINK OPERATION

CROSS-REFERENCE TO RELATED APPLICATIONS

This application claims priority to Finnish patent application No. 20206345, filed Dec. 21, 2020, entitled "IMPROVED UPLINK OPERATION" which is hereby incorporated by reference in its entirety.

FIELD

The following exemplary embodiments relate to wireless communication.

BACKGROUND

Wireless communication enables connecting to various devices in all kinds of environments. As technology develops, enhanced operations may use resources of a device more than earlier. Improving operations performed in the wireless communication may therefore be desirable for smarter usage of resources.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to secure orientation of a first type of an antenna and a second type of an antenna, wherein the first type of an antenna and the second type of an antenna are comprised in a terminal device, determine if the terminal device is radio resource control connected to a cell provided by an access node comprised, at least partly, in a satellite or relayed through the satellite, and if it is, estimate a link loss based, at least partly, on downlink receive measurements obtained using the first type of an antenna, determine an uplink link budget based on the estimated link loss, determine if the uplink link budget is greater than a threshold for a transmit antenna, wherein the transmit antenna is the first type of the antenna or the second type of an antenna, and attempt a transmission to the access node using the transmit antenna if the uplink link budget is greater than the threshold for the transmission antenna.

According to a second aspect there is provided an apparatus comprising means for securing orientation of a first type of an antenna and a second type of an antenna, wherein the first type of an antenna and the second type of an antenna are comprised in a terminal device, determining if the terminal device is radio resource control connected to a cell provided by an access node comprised, at least partly, in a satellite or relayed through the satellite, and if it is, estimating a link loss based, at least partly, on downlink receive measurements obtained using the first type of an antenna, determining an uplink link budget based on the estimated link loss, determining if the uplink link budget is greater than a threshold for a transmit antenna, wherein the transmit antenna is the first type of the antenna or the second type of an antenna, and attempting a transmission to the access node using the transmit antenna if the uplink link budget is greater than the threshold for the transmission antenna.

According to a third aspect there is provided a method comprising securing orientation of a first type of an antenna and a second type of an antenna, wherein the first type of an antenna and the second type of an antenna are comprised in a terminal device, determining if the terminal device is radio resource control connected to a cell provided by an access node comprised, at least partly, in a satellite or relayed through the satellite, and if it is, estimating a link loss based, at least partly, on downlink receive measurements obtained using the first type of an antenna, determining an uplink link budget based on the estimated link loss, determining if the uplink link budget is greater than a threshold for a transmit antenna, wherein the transmit antenna is the first type of the antenna or the second type of an antenna, and attempting a transmission to the access node using the transmit antenna if the uplink link budget is greater than the threshold for the transmission antenna.

According to a fourth aspect there is provided a computer program comprising instructions for causing an apparatus to perform at least the following: secure orientation of a first type of an antenna and a second type of an antenna, wherein the first type of an antenna and the second type of an antenna are comprised in a terminal device, determine if the terminal device is radio resource control connected to a cell provided by an access node comprised, at least partly, in a satellite or relayed through the satellite, and if it is, estimate a link loss based, at least partly, on downlink receive measurements obtained using the first type of an antenna, determine an uplink link budget based on the estimated link loss, determine if the uplink link budget is greater than a threshold for a transmit antenna, wherein the transmit antenna is the first type of the antenna or the second type of an antenna, and attempt a transmission to the access node using the transmit antenna if the uplink link budget is greater than the threshold for the transmission antenna.

According to a fifth aspect there is provided a computer program product comprising instructions for causing an apparatus to perform at least the following: secure orientation of a first type of an antenna and a second type of an antenna, wherein the first type of an antenna and the second type of an antenna are comprised in a terminal device, determine if the terminal device is radio resource control connected to a cell provided by an access node comprised, at least partly, in a satellite or relayed through the satellite, and if it is, estimate a link loss based, at least partly, on downlink receive measurements obtained using the first type of an antenna, determine an uplink link budget based on the estimated link loss, determine if the uplink link budget is greater than a threshold for a transmit antenna, wherein the transmit antenna is the first type of the antenna or the second type of an antenna, and attempt a transmission to the access node using the transmit antenna if the uplink link budget is greater than the threshold for the transmission antenna.

According to a sixth aspect there is provided a computer program comprising instructions stored thereon for performing at least the following: secure orientation of a first type of an antenna and a second type of an antenna, wherein the first type of an antenna and the second type of an antenna are comprised in a terminal device, determine if the terminal device is radio resource control connected to a cell provided by an access node comprised, at least partly, in a satellite or relayed through the satellite, and if it is, estimate a link loss based, at least partly, on downlink receive measurements obtained using the first type of an antenna, determine an uplink link budget based on the estimated link loss, determine if the uplink link budget is greater than a threshold for a transmit antenna, wherein the transmit antenna is the first type of the antenna or the second type of an antenna, and attempt a transmission to the access node using the transmit antenna if the uplink link budget is greater than the threshold for the transmission antenna.

According to a seventh aspect there is provided a non-transitory computer readable medium comprising program instructions for causing an apparatus to perform at least the following: secure orientation of a first type of an antenna and a second type of an antenna, wherein the first type of an antenna and the second type of an antenna are comprised in a terminal device, determine if the terminal device is radio resource control connected to a cell provided by an access node comprised, at least partly, in a satellite or relayed through the satellite, and if it is, estimate a link loss based, at least partly, on downlink receive measurements obtained using the first type of an antenna, determine an uplink link budget based on the estimated link loss, determine if the uplink link budget is greater than a threshold for a transmit antenna, wherein the transmit antenna is the first type of the antenna or the second type of an antenna, and attempt a transmission to the access node using the transmit antenna if the uplink link budget is greater than the threshold for the transmission antenna.

According to an eight aspect there is provided non-transitory computer readable medium comprising program instructions stored thereon for performing at least the following: secure orientation of a first type of an antenna and a second type of an antenna, wherein the first type of an antenna and the second type of an antenna are comprised in a terminal device, determine if the terminal device is radio resource control connected to a cell provided by an access node comprised, at least partly, in a satellite or relayed through the satellite, and if it is, estimate a link loss based, at least partly, on downlink receive measurements obtained using the first type of an antenna, determine an uplink link budget based on the estimated link loss, determine if the uplink link budget is greater than a threshold for a transmit antenna, wherein the transmit antenna is the first type of the antenna or the second type of an antenna, and attempt a transmission to the access node using the transmit antenna if the uplink link budget is greater than the threshold for the transmission antenna.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
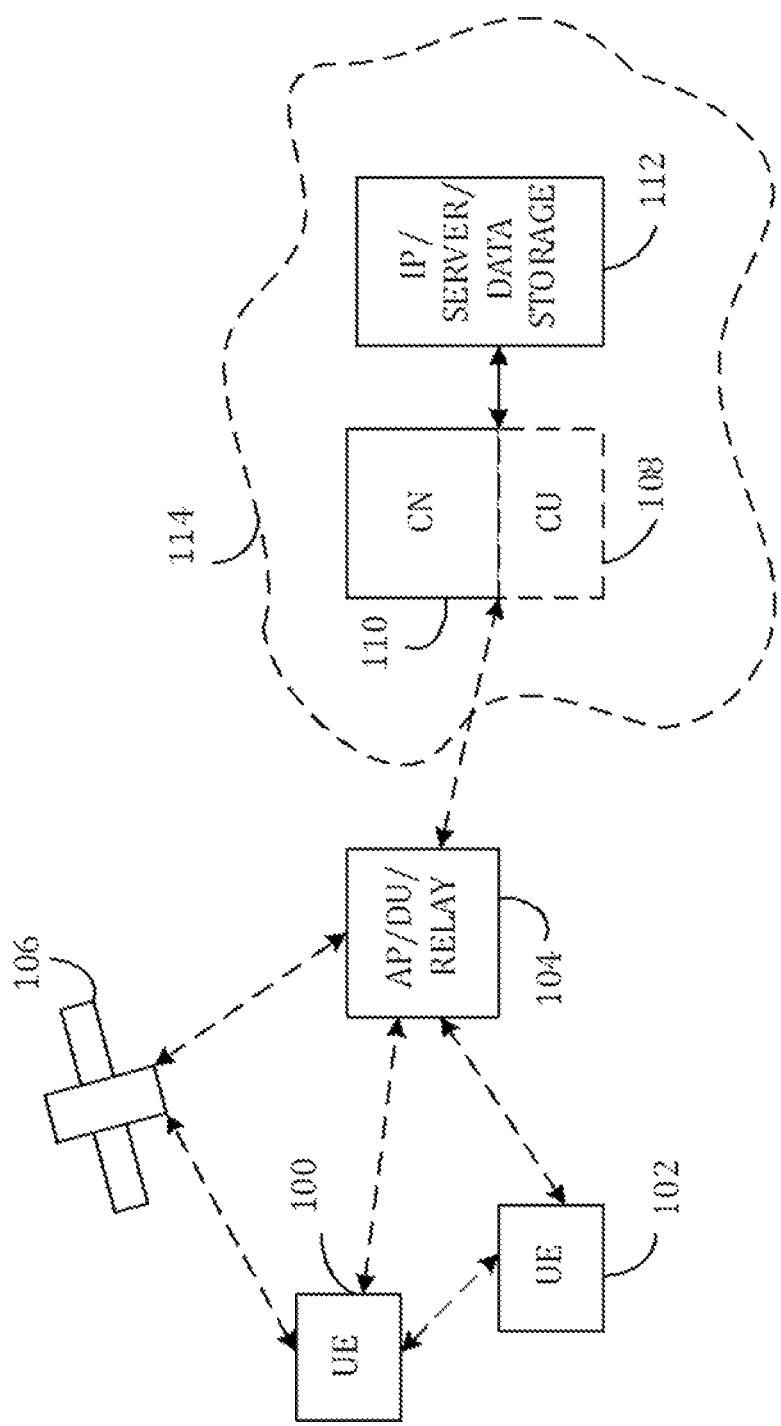

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or 5G-nodeB (gNB). It should be appreciated that MEC can be applied in 4G networks as well.

5G may also utilize satellite communication to enhance or complement the coverage of 5G service, for example by providing backhauling. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). An HNB Gateway (HNB-GW), which may be installed within an operator's network may aggregate traffic from a large number of HNBs back to a core network.

Figure 2:
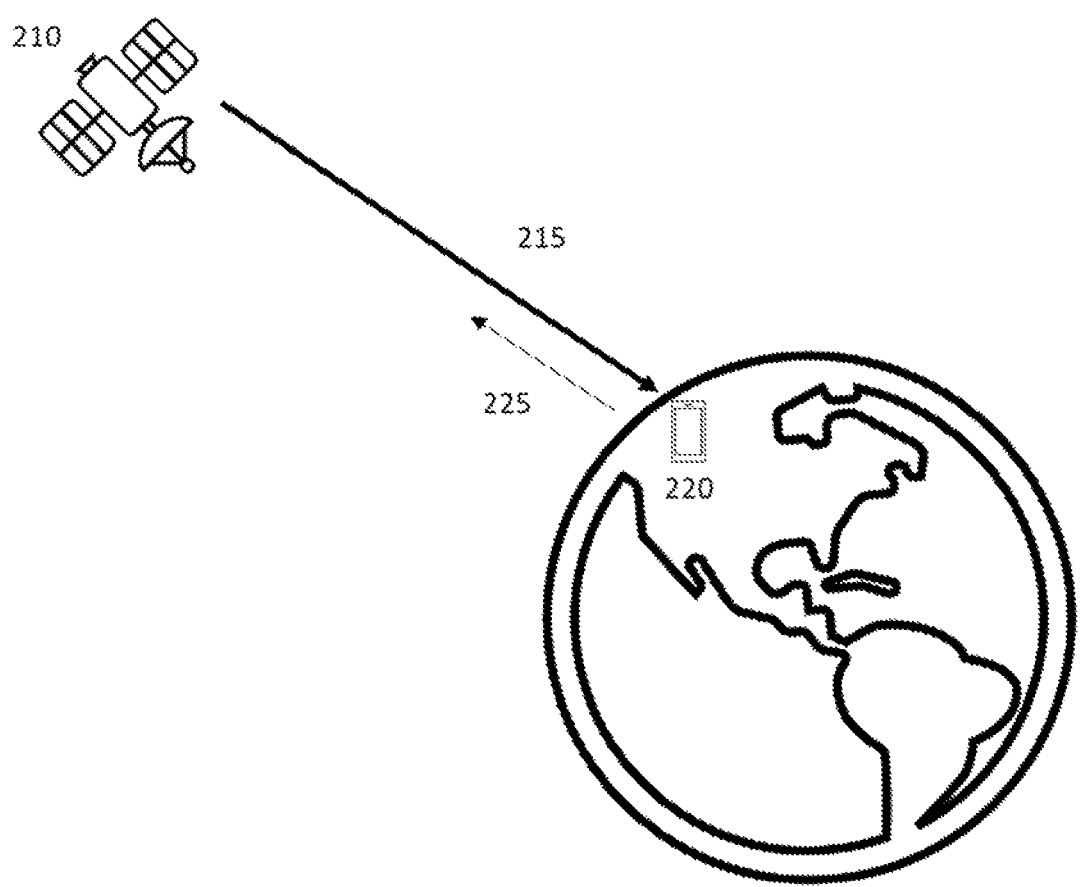
FIG. 2 illustrates an exemplary embodiment of a terminal device utilizing a non-terrestrial network.

If a non-terrestrial network, NTN, is utilized and an access node such as a gNB is located, at least partly, on a satellite such as a LEO satellite, or is relayed through a satellite such as a LEO satellite, extreme operating link loss may occur more easily compared to terrestrial networks. In NTN, the transmit power level of the access node may be significantly superior to that available for a terminal device such as a mobile phone. An exemplary embodiment of a terminal device utilizing NTN and therefore being prone extreme operating link loss is illustrated in FIG. 2. In this exemplary embodiment, an access node 210, that is a gNB, is located at least partly on a LEO satellite. The terminal device 220 in this exemplary embodiment corresponds to power class 3 of a 3GPP specification, but other types of terminal devices could be used as well. In this exemplary embodiment, the transmit power level of the access node 210 as well as its antenna gain are superior to those of the terminal device 220. In this exemplary embodiment, the terminal device is still to reach into the sky, to for example 500-1600 km. Such distance may be considerably beyond a terrestrial cell that may be from a few 10s km to a maximum of 100 km. Yet, the terminal device 210 is restricted in output power to 23 dBm and has significantly lower antenna gain as compared to the much larger antennas of the satellite. The arrow 215 in FIG. 2 illustrates power of a downlink, DL, signal transmitted by the access node 210 and the arrow 225 illustrates the uplink UL, signal and its power transmitted by the transmitter TX of the terminal device 220.

Figure 3A:
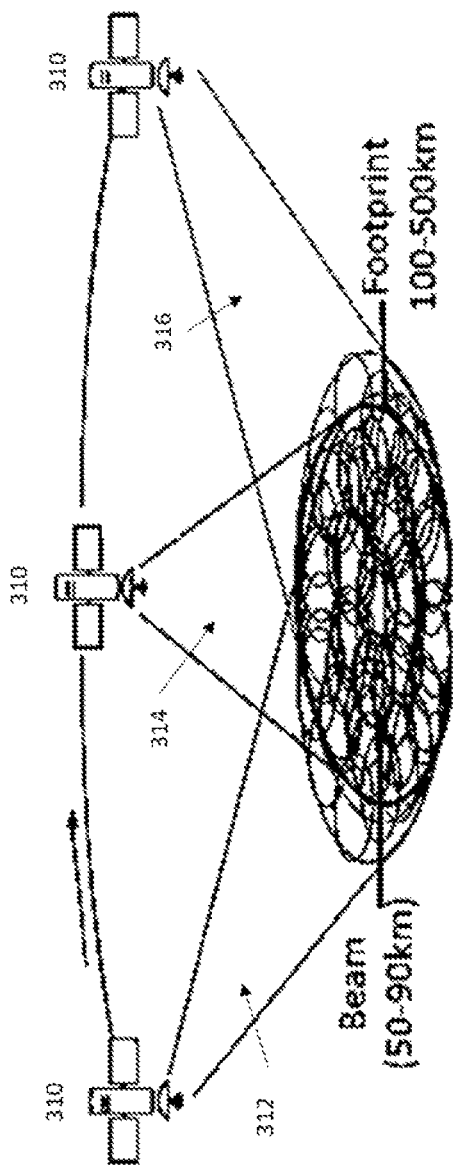
FIG. 3A illustrates an exemplary embodiment of a satellite with a fixed footprint.

FIG. 3A illustrates an exemplary embodiment of NTN in which a footprint provided by a satellite 310 comprising, at least partly, an access node, remains at the same geographical location for an extended period of time and is thereby a fixed footprint. The beams and cells provided by the access node comprised in the satellite 310 may change their shape and distance to the satellite relative to the elevation angle as is illustrated by the footprints 312, 314 and 316. Thus, the terminal device is to cope with large distances in the horizon. In this exemplary embodiment, the satellite 310 moves at a speed of 7.5 km/s. At that rate considering 3854 km in travelling distance, as an example, continuous coverage would leave a terminal device to perform satellite handovers every 8.5 minutes.

Figure 3B:
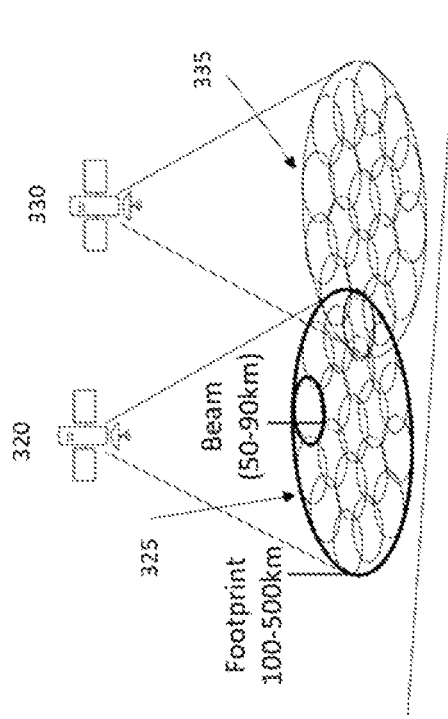
FIG. 3B illustrates an exemplary embodiment of an Earth-moving beams.

FIG. 3B illustrates an exemplary embodiment of NTN with Earth moving beams. In this exemplary embodiment there are satellites 320 and 330 that each comprise, at least partly, an access node. The footprints 325 and 335 provided by the satellites 320 and 330 have a constant size and thus beams and cells within the footprints will move across earth surface at the speed of the satellite. A terminal device, in this exemplary embodiment, is to perform handovers, both for each cell but also for each satellite. In this exemplary embodiment, the satellites 320 and 330 move at a speed of 7.5 km/s and have cell sizes of 50-90 km. Thus, the terminal device is to perform a handover for a beam and/or cell every 6.5-12 seconds. The intervals between satellite handovers may, in this exemplary embodiment be substantially every 1 minute.

As the terminal device, such as those that may be used in the exemplary embodiments described above, may have a transmit power of for example 23 dBm and an antenna gain of 0 dBi, the antenna gain may not be sufficient for example in view of those of an access node that may be. Therefore, uplink and downlink link budgets may be significantly different due to different antenna gains and transmit power capabilities of the satellite and a terminal device that may be a handheld device. Therefore, it may be that a terminal device observing good downlink radio conditions may attempt uplink transmissions, which will have very limited probability of being received by the satellite. That would cause unnecessary consumption of battery capacity. For example, in the case of the earth-moving cells, as well as in any other radio system, it is beneficial that the uplink transmissions of the terminal device are received to ensure continuous service continuity and good mobility performance.

Thus, it is desirable to obtain higher antenna gain for the terminal device without demanding very large antenna elements such as a dish antenna or similar, which may include additional active elements to further increase the gain. The terminal device operating in an NTN environment may however have capabilities to assess and determine a path loss to a satellite as part of the uplink power control procedure. One example of determining the pathloss is for example the following approach:

Determine own location, which is the location of the terminal device, and satellite location. Then based on the locations derive a distance, d, from the terminal device to the satellite. Next, determine a frequency at which this system operates, f, and calculate a free space pathloss using the equation below.

$$\text{Free Space Pathloss} = 20 \cdot \log_{10}(d) + 20 \cdot \log_{10}(f) + 20 \cdot \log_{10}\left(\frac{4\pi}{c}\right)$$

Next, use a maximum transmission output power of the terminal device and add antenna gain of the terminal device from which the free space pathloss is subtracted, which would be the input power at the satellite. Finally, add satellite antenna gain using the equation below.

UL power at satellite=$P_{MAX}+G_{TX\_Device}+G_{RX\_SAT}-$ Free Space Pathloss

Figure 4:
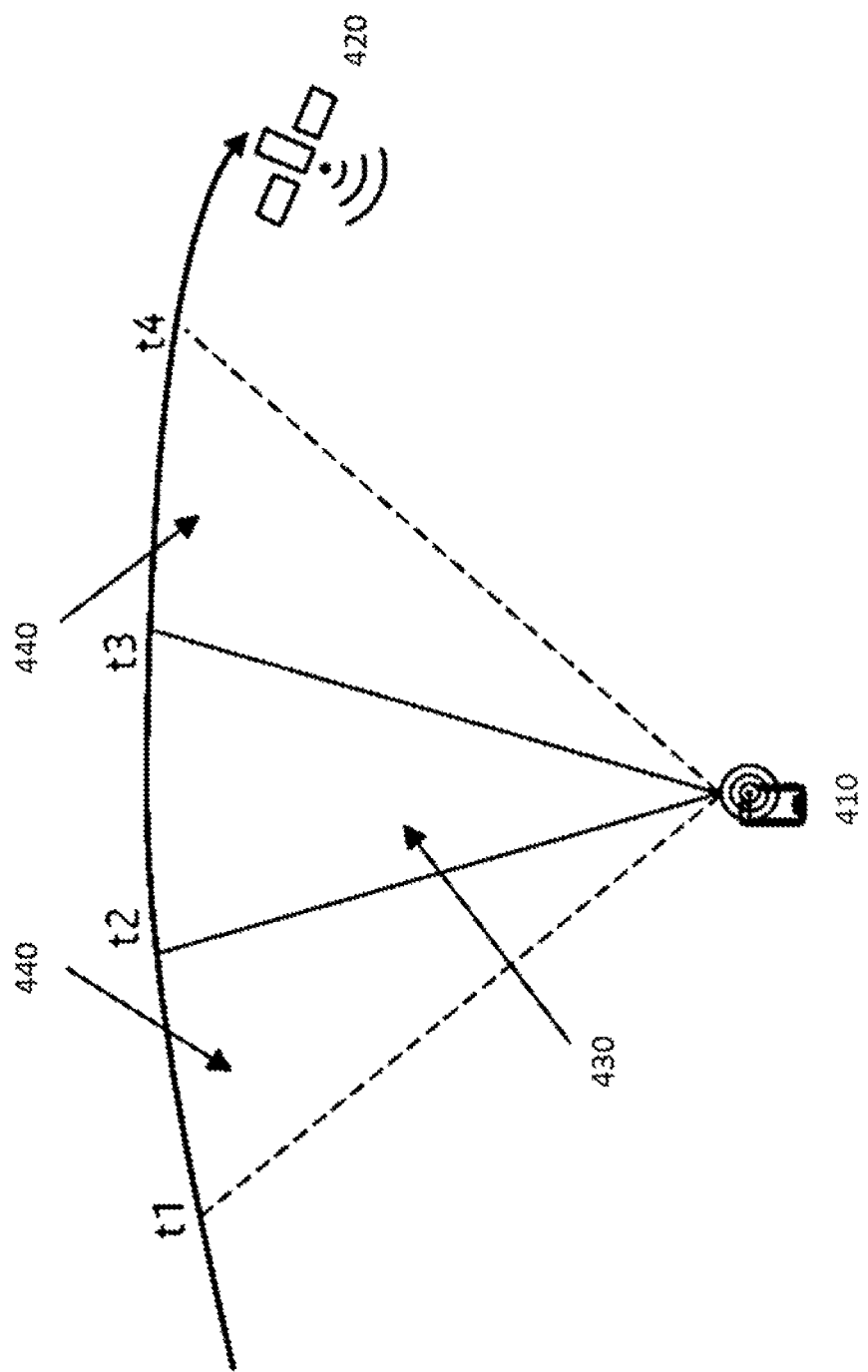
FIG. 4 illustrates an exemplary embodiment of a terminal device operating in a non-terrestrial network.

If a terminal device operating in an NTN environment has capabilities to assess and determine a path loss to a satellite as part of the uplink power control procedure, that enables the terminal device to transmit towards the satellite within the appropriate time and duration, provided that the terminal device has an antenna system that allows such radiation propagation. FIG. 4 illustrates an exemplary embodiment of such a scenario. In FIG. 4 a terminal device 410 is connected to an NTN that comprises a satellite 420. The satellite 420 comprises, at least partly, an access node such as a gNB. The time duration t1-t4 illustrates a time span during which the terminal device 410 may communicate with the access node comprised in the satellite 420. However, the time spans 440 are such that due to additional distance, the likelihood of loss increases and it may prohibit the terminal device 410 from transmitting UL data with sufficiently high output power to maintain the radio link to the access node comprised in the satellite 420. Further, bad weather conditions may further increase the time spans 440. The time span 430 on the other hand illustrates an optimal time to communicate with the access node comprised in the access node 420.

A terminal device may be able to use two different types of antenna for the purpose of NTN communication. The terminal device may have a link antenna, which serves for data transfer within a partial coverage of the hemisphere, such as the time span 430, whereas another antenna, a monitoring antenna, may serve for receiving for example during the time span 440. In some exemplary embodiment, the monitoring antenna may serve only for receiving DL transmissions from the access node comprised in the satellite. The monitoring antenna may be used to search for and measure neighbour cells and/or satellites, and to obtain system information from target cells for example. This may help to reduce latency in setting up a new connection towards a target cell and make relevant neighbour cell measurements available when needed.

Figure 5B:
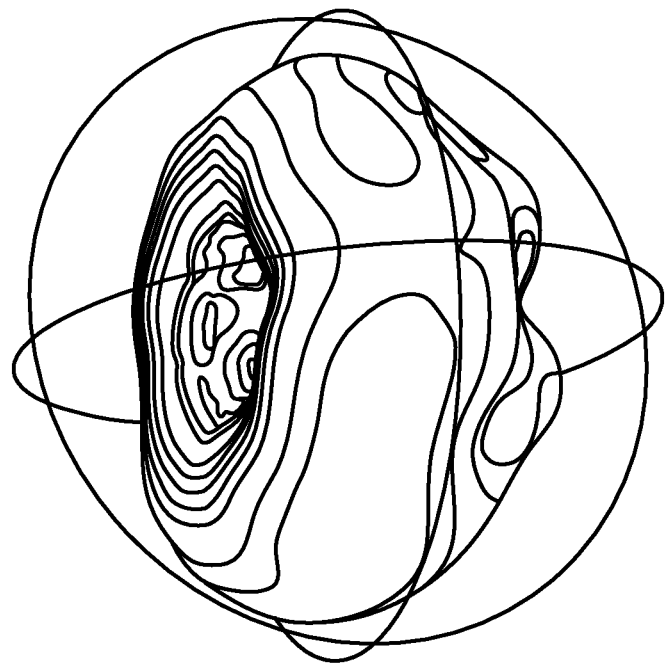
FIG. 5B illustrates an exemplary embodiment of a second type of an antenna.
Figure 5A:
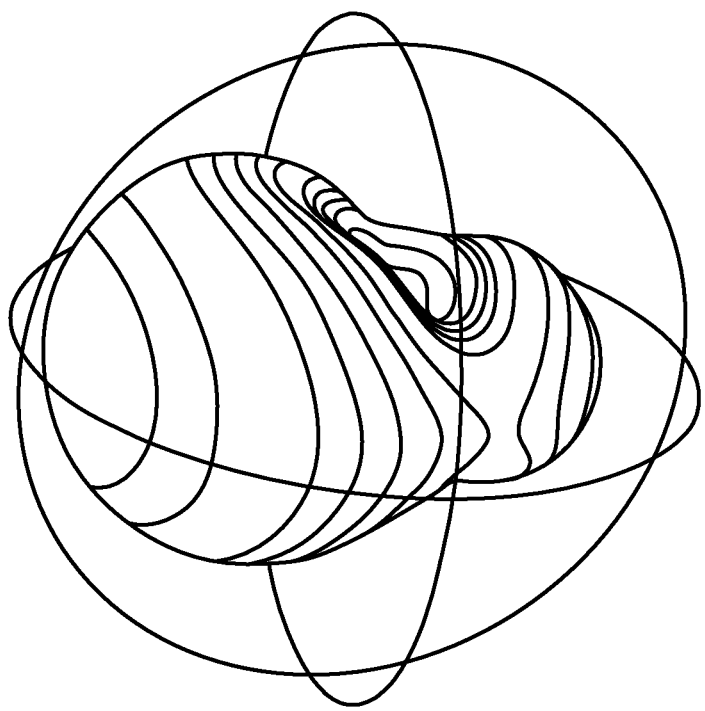
FIG. 5A illustrates an exemplary embodiment of a first type of an antenna.

FIG. 5A illustrates an exemplary embodiment of a first type of antenna that may be a link antenna. FIG. 5B illustrates a second type of antenna that may be a monitoring antenna. As is illustrated in FIG. 5A, a link antenna may have its gain direction straight up and may be of various 3 dB widths ranging from 45 degrees to 60 degrees for example. Examples of a link antenna comprise Vivaldi antenna, Yagi-Uda, Triangular patch antenna and a patch antenna.

As is illustrated in FIG. 5B, a monitoring antenna may have its optimum gain at 45 degrees omni-directionally at the expense of upwards gain. Examples of a monitoring antenna comprise Vpol blade antenna and a patch antenna.

While the link antenna thus has a higher gain in a single direction, the monitoring antenna may provide its maximum gain at a fixed elevation angle designed to match the drop-off in gain of the link antenna at all azimuth angles. This enables the monitoring antenna to detect cells from any azimuth direction prior to the link antenna doing so. Thus, the monitoring antenna has higher gain in the elevation angle range where new satellites will appear, for example at 30-60 degrees, but potentially lower gain straight up, where the link antenna may be utilized instead and may be superior to the omni-directional antenna. The terminal device may be able to determine which antenna to utilize for which purpose. This may be achieved using one or more algorithms that control the selection and purpose of the antennas. The one or more algorithms may comprise determining orientation of the terminal device by means of for example a digital gyroscope that assists in panel selection. The monitoring antenna may be used for receiving basic information such as primary and secondary synchronization signals and system information broadcast from satellites. Such satellites may be in areas corresponding to time spans 440 in the FIG. 4. While the terminal device may not have enough power to transmit at high enough power to reach the satellite in these areas, the DL transmission of the satellite gNB is of sufficiently high power that the terminal device can receive the DL. Using the monitoring antennas for tracking the DL of the satellites the terminal device would know when the satellite is within a range that is the pathloss that the link antenna will serve for proper communication quality and payload.

Figure 6:
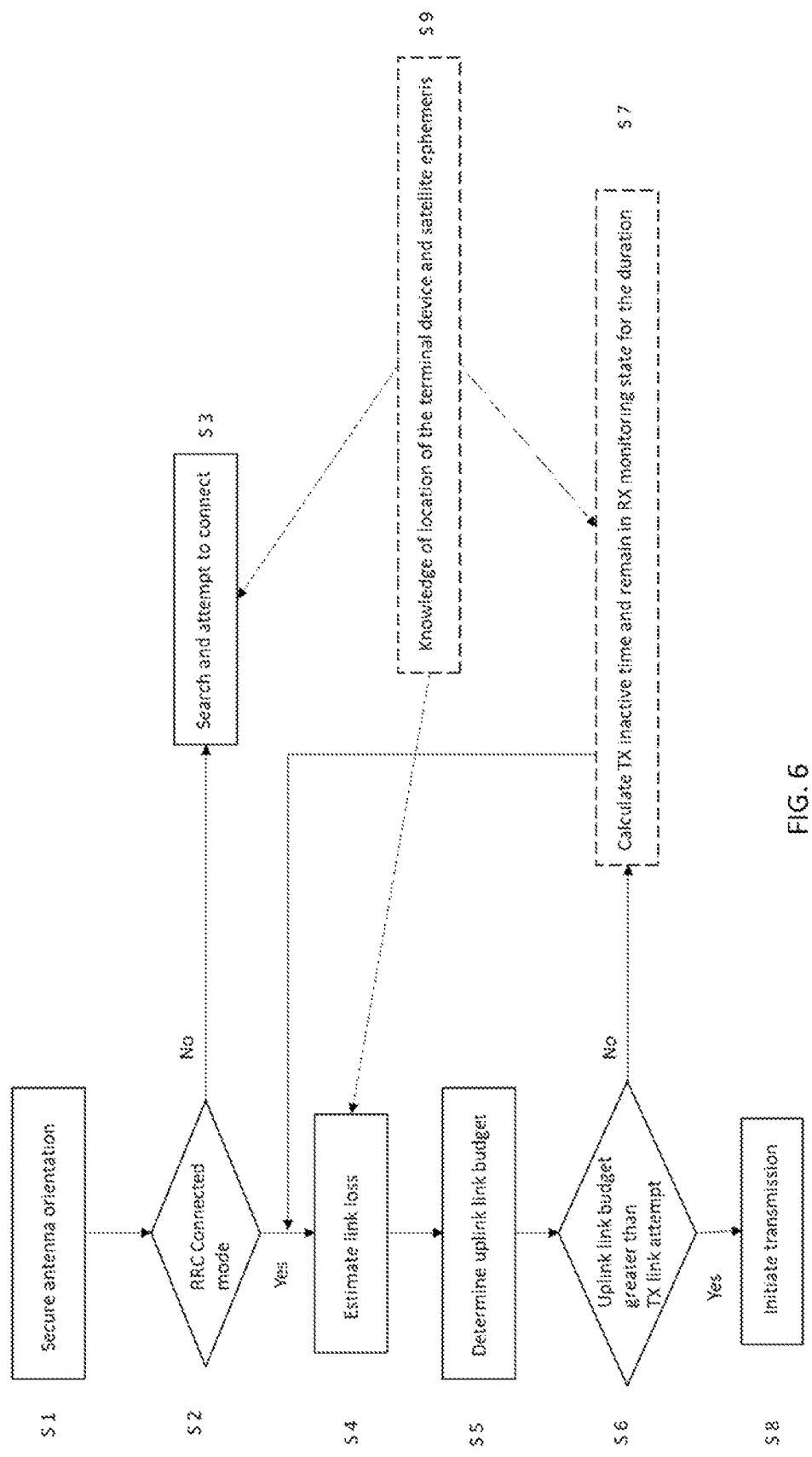
FIG. 6 illustrates a flow chart according to an exemplary embodiment.

A terminal device that is capable of connecting to an NTN and which may select at least between a link antenna and a monitoring antenna may thus utilize the link antenna for uplink communication. FIG. 6 illustrates a flow chart according to an exemplary embodiment in which a terminal device utilizes a link antenna for uplink communication. In S1 the orientation of the at least two antennas, that are of different types, is secured. This may be performed in any suitable manner, for example in the following manners:

Mechanically: The antennas may be implemented such that a gyro-fixture benefits of gravity and thereby point the antennas at the designated directions.

Electrically: The antennas may be implemented such that an electrically controlled gyro-fixture, that positions the antenna, receives information from a controller circuitry that reads the vertical alignment and adjusts the antennas into place.

Pre-determined using implementation design: In case the terminal device comprises a display and is mounted to a structure, such as in a vessel or in a vehicle, the orientation may be pre-determined and obtained from the implementation design.

User interaction: A user may position the antennas, for example if the antenna is part of an aperture, such as backside of a laptop display, that would lock in place when the orientation is straight up. Alternatively, the antenna may be integrated into the cover of a terminal device such as a handset and through gyroscope chip indicate to the user on display, when the antenna is locked into the proper position.

Antenna power reading and beam control: Using a signal received from the satellite, beam steering of a phased array patch antennas may be performed.

The manner used to secure the orientation of the antennas may be dependent on how the antenna design achieves the directional alignment of the antennas that serves the purpose of directional gain. Further, the orientation the angular coverage may be secured such that the link and the monitoring antennas overlap with optimum directional gain at the boundary between their regions of operation. This may be comprised in one or more algorithms used for determining pathloss and the position of the antenna for correct calculations of when to switch antennas, and when to perform TX uplink with the link antenna.

Once the position has been secured, next in S2, it is determined whether the terminal device is radio resource control, RRC, connected to a cell as is required to perform a data transmission. If the terminal device is not RRC connected to a cell, then in S3 the terminal device continues to search for and connect to a suitable cell. The searching may be performed using the link and/or monitoring antenna. It is to be noted that as the antennas are split in two different radiation patterns that extends the range by focusing the energy of the antenna into a smaller surface compared to for example a solution using omni-directional antennas. Optionally, in some exemplary embodiments, the search may be temporarily disabled if knowledge regarding the terminal device and satellite locations indicate too large distance. The knowledge regarding the location of the terminal device and satellite ephemeris is illustrated in S9. Additionally, the terminal device may determine whether to initiate RRC Connection Establishment.

If the terminal device is in the RRC Connected state, the terminal device then estimates link loss based on downlink receive measurements as illustrated in S4. Additionally, estimating the link loss may be supplemented and/or confirmed using knowledge regarding location of the terminal device and satellite ephemeris illustrated in S9. This may be beneficial, for example, if a sanity check is to be performed. The terminal device may utilize the link or the monitoring antenna to receive downlink measurements. The selection may be done based on where the satellite is relative to the location of the terminal device.

Having two spatially separated antennas when estimating link loss may be beneficial as the terminal device may have knowledge searching for a suitable cell that the monitoring antenna has better antenna gain in low orbit angles compared to the link antenna, and therefore detection will most likely occur in the low orbit angles that comprises the largest time duration of the satellite passing. Additionally, the terminal device may have knowledge regarding the cross over gain delta between the monitoring antenna and the link antenna, which may be determined by design and comprised in the one or more algorithms used to select the antenna. For example, the monitoring antenna may be used at low elevation angles until a certain point, after which the terminal device switches to the link antenna. The link antenna may then be used until another point after which the terminal device may switch back to the monitoring antenna. In this example, the gains at the switching points may be very similar for both antennas. In this example, the gains of the antennas are comprised in a calibration of the radiated performance and the switch between the antennas is performed after the link antenna begins to show higher reference signal received power, RSRP, levels than the monitoring antenna, and it has been tracked on consecutive RX slots that the satellite is approaching and not descending. Alternatively, or in combination with that, the terminal device may utilize information on satellite location and the position of the terminal device to calculate the elevation angle and then apply that to make the antenna switch. This may allow the terminal device to determine when the link antenna will serve for TX operation, by evaluating the delta in received power on the monitoring antenna versus the link antenna. In examples that allow TX using the monitoring antenna, the RX link loss estimation in combination with the link antenna results may reveal that the TX may be achieved even on the monitoring antenna. This may happen in a short window, when conditions of the loss are low enough.

Next, in S5, the terminal device may determine a required uplink link budget and proceed to evaluate, whether the uplink link budget exceeds the capabilities of the terminal device. It is to be noted that TX link attempt may be a device specific threshold established by the manufacturer and it may be considered as a threshold for a transmit antenna. The threshold may be antenna specific and if the transmit antenna is the link antenna, it may have a different threshold than if the transmit antenna is the monitoring antenna. As such, two thresholds may be present, one for each antenna. The uplink link budget may be estimated based on the estimated link loss, the available uplink transmit power, transmit capability such as power class and/or which antenna was used for the downlink monitoring and which antenna will be used for the uplink transmission. When evaluating uplink link budget, the antenna gain of both antennas is to be taken into account when determining if the antenna has sufficient power available to transmit to the satellite.

If the estimated uplink link budget is greater than transmission link attempt, then in S8, the terminal device may proceed to perform procedures for transmission. The transmission may be according to 3GPP procedures for example and may comprise requesting a scheduling grant to transmit a buffer status report. If the estimated uplink link budget does not exceed the TX link attempt, then in S7 the terminal device may re-evaluate the link loss at a later point in time to determine when to attempt the transmission. The TX inactive time, in other words transmit inactive time, which is the time until the terminal device re-evaluates the link loss, may be based on an estimate of when the link loss has decreased X dB, allowing for the TX link attempt threshold to be confirmed. Such an estimate may be based on the knowledge of the locations of the terminal device and the access node as is illustrated in S9. For example, the transmit inactive time may be the time during which the terminal device determines, based on its location and on the ephemeris of the satellite, when the satellite has moved sufficiently close to the terminal device such that the link loss is decreased sufficiently for a successful transmission.

As noted above the TX link attempt may be a device-specific threshold. However, the threshold may seek to determine what uplink link budget levels the terminal device can accommodate, in other words, at which link budget levels communication with the satellite becomes feasible, and may therefore reflect not only path loss, but also satellite antenna gain. In some exemplary embodiment, the terminal device may apply a learning loop to adjust the TX link attempt, when the terminal device is communicating with satellites of a specific constellation. For example, if the uplink link budget is determined to be greater than the TX link budget X times, but the ensuing transmission attempt has failed either all X or Y<X times, the terminal device may increase the TX link attempt value some dBs, to ensure connection attempts are made in better signalling conditions. In a similar manner, the terminal device may decrease TX link attempt if Z connection attempts result in successful transmissions. This may help to ensure the UE is not consistently too conservative or too aggressive.

It is to be noted that at some point in time the satellite will leave the region, where the link antenna is providing best connection. At this point it may be necessary to stop the data transfer or switch to the monitoring antenna to continue the transfer.

Alternatively, the terminal device may switch to the monitoring antenna and start searching for the next satellite. In some exemplary embodiments, the terminal device is allowed to use the monitoring antenna to search for the next satellite prior to the point in time in which the link antenna may no longer be used for connectivity with the current satellite. In both exemplary embodiments, the terminal device may however perform the exemplary embodiment of the above described flow chart all over. Depending on the satellite constellation it may remain RRC Connected. In some exemplary embodiments, the monitoring antenna may be activated based on ephemeris of a plurality of satellites to enable the monitoring antenna to search for a next cell. It is also to be noted that in some exemplary embodiments, the monitoring antenna may be used to search, measure and/or obtain system information for neighbour cells simultaneously, or partly simultaneously, with the link antenna being used for communication with the RRC connected cell. It is to be noted that the link antenna may also be in an RRC Idle or in an RRC Inactive state instead of RRC connected state while the monitoring antenna is being used to search, measure and/or obtain system information for neighbour cells.

In some exemplary embodiments, terminal device may attempt to optimize the uplink transmission time further to save energy. To achieve this, the terminal device may take into account the following aspects:

- A previously estimated window of uplink transmission opportunity i.e. the duration where sufficient uplink link budget is available. This may be based on estimates from the RX monitoring antennas, and/or path loss estimation based on the location of the terminal device and satellite ephemeris.
- A device-specific mapping of uplink transmit power for example in terms of dBm or W to instantaneous power draw W from the energy source. The terminal device may also consider the remaining available energy in the source, e.g., battery status.
- The amount of data to transmit that may be obtained for example from buffer status of the terminal device based on higher layer information including application layer. Whether the data is delay critical may also be considered. Delay tolerant data may comprise for example a sensor reporting temperature once per hour, the approximate location of a package, or a video/image.

Having obtained the above metrics, the terminal device may initiate the following procedure: First the terminal device may use the previously estimated window of uplink transmission opportunity to estimate the required transmit power and the achievable throughput for each segment of the window, where uplink transmissions are feasible. The segments may be subframes, radio frames or any other time measure chosen by the terminal device. Next, using the device-specific mapping of uplink transmit power to instantaneous power draw from the energy source, the terminal device may estimate the energy required to transmit in each of the segments. The uplink encoding rate may have a minimal impact on the overall energy consumption, which is dominated by the uplink transmit power. Finally, the terminal device may obtain the amount of data to be transmitted. If the terminal device determines that the data is not delay critical it may initiate a search across the segments to determine the most energy efficient time segment(s) to transmit. The energy consumption may be understood as a function of the following aspects:

Number of segments used for transmission. This may depend on the modulation and coding scheme and the resource allocation, but the terminal device may use an average data rate value per segment, e.g. based on past allocations.

Uplink transmit power consumption per segment.

After this, in this exemplary embodiment, the terminal device may initiate the transmission of the data in the identified segment(s). It is to be noted that transmission of uplink data transmissions is a network-controlled procedure, but in this exemplary embodiment, the terminal device may at least initiate a buffer status report, BSR, at the right moment in time and the network may have resources available to issue a scheduling grant. Table 1 below provides an example of the terminal device's estimation of the number of required segments and the related energy consumption, which depends on in which segment the uplink transmission is initiated. The terminal device may also include the energy required for a 4-step uplink scheduling procedure i.e. scheduling request to transmit BSR and the transmission of the BSR, prior to the actual uplink transmission.

TABLE 1

| First segment | #segments used for transmission | Energy |
|---|---|---|
| 1 | 3 (segments 1, 2, 3) | 4 + 4 + 2 = 10 |
| 2 | 3 (segments 2, 3, 4) | 4 + 2 + 3 = 9 |
| 3 | 2 (segments 3, 4) | 2 + 3 = 5 |
| 4 | Not possible to finish transmission due to insufficient link budget | Not available |

Figure 7:
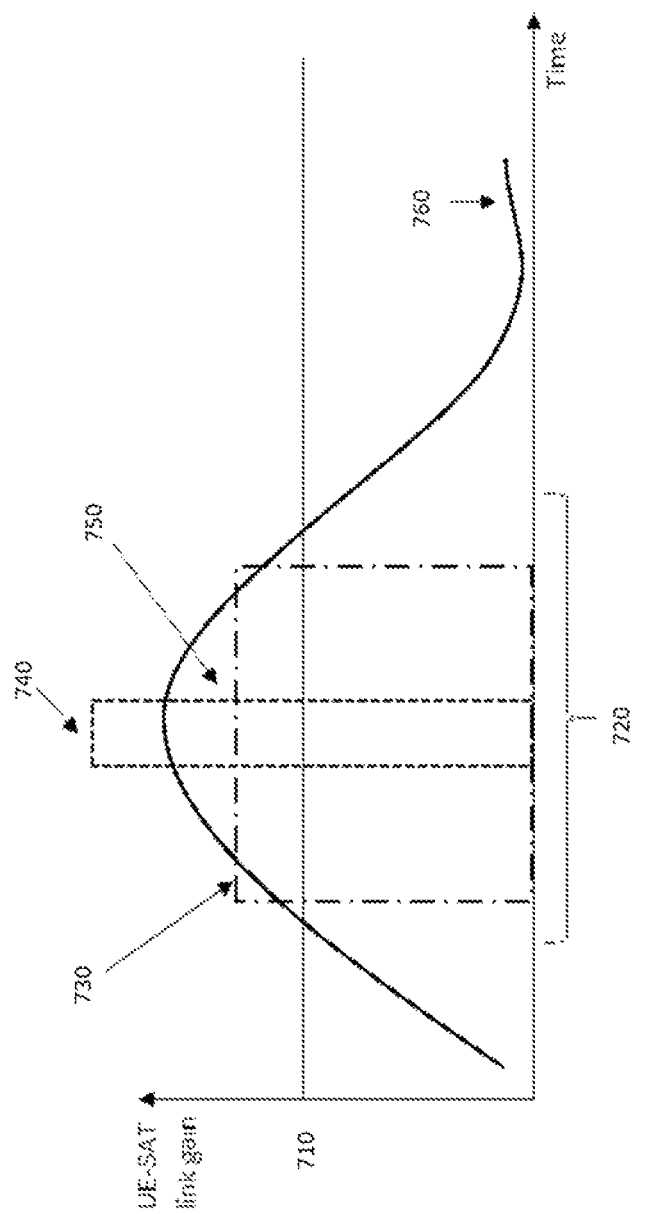
FIG. 7 illustrates an exemplary embodiment of a terminal device determining when to initiate uplink transmission.

An advantage of the exemplary embodiment above is the additional energy savings, which may be achieved because the terminal device has knowledge regarding its uplink data and the power amplifier performance. Thus, it may determine, for example, if it is most energy efficient to transmit with 23 dBm for 1 s or 20 dBm for 2 s for a given implementation of the terminal device. FIG. 7 illustrates how the terminal device may utilize the estimated link gain or path loss in combination with knowledge about the transmit power consumption to determine when to initiate the uplink transmission. 710 illustrates the threshold for an insufficient link budget for uplink communication. It is to be noted that the link gain may be inversely proportional to the required uplink transmit power. Portion 720 illustrates uplink transmit power that is sufficient to communicate. The area 730 illustrates a time window in which the terminal device is to try to complete transfer of a large message. 750 illustrates that if the terminal device initiates transmission of a large message late, it may not be able to finish it or will consume excessive amount of energy to transmit the message. 740 illustrates an optimal transmission time for a small message. 760 illustrates the terminal device may estimate the link gain based on its location and the satellite ephemeris.

The radio architecture of a terminal device used in the exemplary embodiment above that may switch between at least two antennas that are of different type may be designed in several ways. Various designs may comprise a trade-off in size, cost, complexity and current. Exemplary embodiments of radio architectures comprised in a terminal device are illustrated in FIG. 8A-8G. In these exemplary embodiments, there are at least one transmitter 840, at least one receiver 850, at least one antenna of a first type, such as a link antenna 810 and at least one antenna of a second type which may be a monitoring antenna 820 or a sectorized monitoring antenna. It is to be noted that in some other exemplary embodiments there may be further types of antennas as well.

The exemplary embodiments illustrated in FIG. 8A-8G enable switching between the two types of antennas. This may be performed in an optimized way by using one or more algorithms as described above. Thus, a trigger to switch between the two types of antennas may be the link loss estimation and optionally also the knowledge about ephemeris of an access node and the location of the terminal device.

Figure 8B:
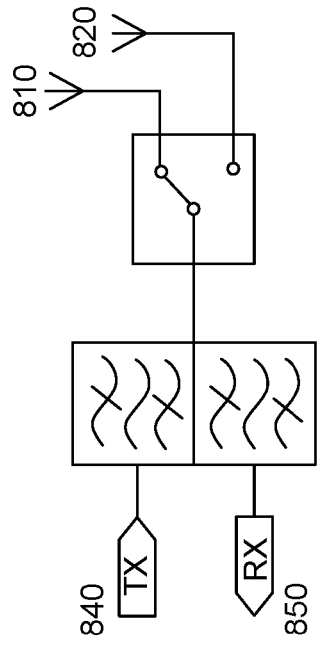
FIG. 8A-8G illustrate exemplary embodiments of radio architectures comprised in a terminal device.
Figure 8D:
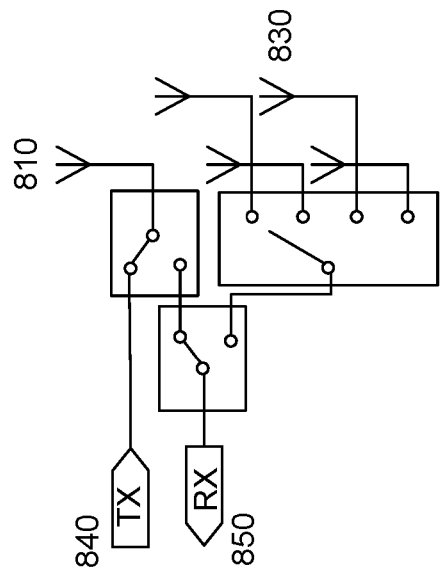
Figure 8A:
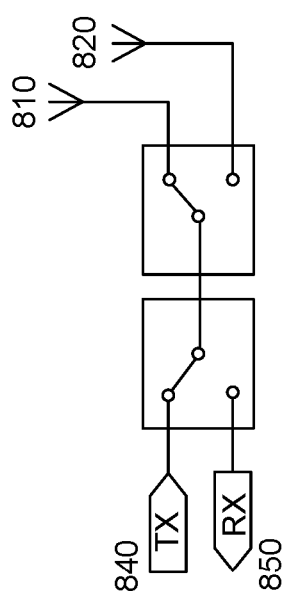

FIG. 8A illustrates an exemplary embodiment in which there is an implementation for a time-division duplex, TDD, variant with selectable antennas through two switches. Alternatively, an x-bar could be used. It is to be noted that in addition to the configurability of the receiver path, also the transmission could be routed to the monitoring antenna. This may be performed for example when it is determined that there is a desired gain for extending the coverage.

FIG. 8B illustrates an exemplary embodiment in which there is an implementation for a frequency-division duplex, FDD, variant with switching for the monitoring antenna. In addition to the configurability of the receiving path, also the transmission could be routed to the monitoring antenna. This may be performed for example when it is determined that there is a desired gain for extending the coverage.

Figure 8C:
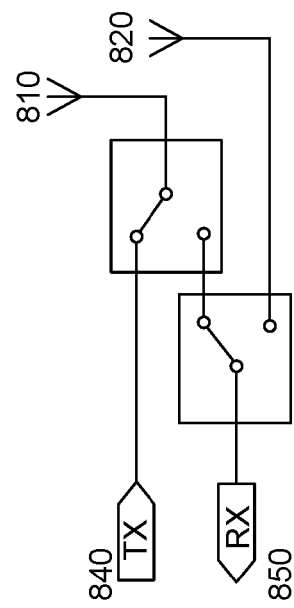

FIG. 8C illustrates an exemplary embodiment in which there is an implementation for a time-division duplex, TDD, variant. In this exemplary embodiment, there is one switch making the transmission path, while the receiver supports two switches. This allows the receiver path to operate while the transmission timeslot is active. This may require the antennas and the implementation design to have sufficient isolation and that the monitoring serves a purpose in the transmission slot. It is to be noted that the switch in the transmitter path may be replaced by a duplex filter to make an FDD variant.

FIG. 8D illustrates a further development of the exemplary embodiment illustrated in FIG. 8C. In this exemplary embodiment, the implementation is further splint into 4 individual sectorized antennas. This may be beneficial for a potential higher directional gain at the expense of switch loss and speed at which the terminal device can monitor directionally. Provided the terminal device is aware of the direction there may not be any penalty in time and therefore advantage in gain may be achieved without trade-offs. The switch in the transmitter path may be replaced by a duplex filter to make an FDD variant.

Figure 8F:
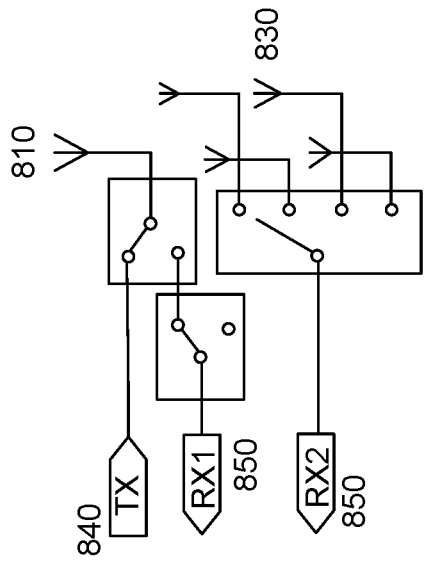
Figure 8E:
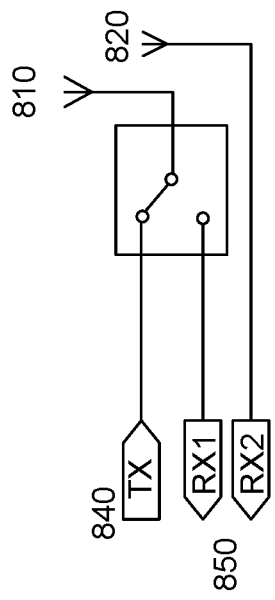

FIG. 8E illustrates an exemplary embodiment of a TDD implementation. In this exemplary embodiment there is a separate transceiver available for receiver monitoring, which may use its own antenna path for its functions. This implementation design may make a trade-off between performance improvement and the expense of complexity, size of design as well as cost. The switch in the transmitter path may be replaced by a duplex filter to make an FDD variant.

FIG. 8F illustrates an exemplary embodiment that further develops the exemplary embodiment illustrated in FIG. 8D. In this exemplary embodiment there are four individual sectorized monitoring antennas having their own dedicated receivers. The switch in the transmitter path may be replaced by a duplex filter to make an FDD variant.

Figure 8G:
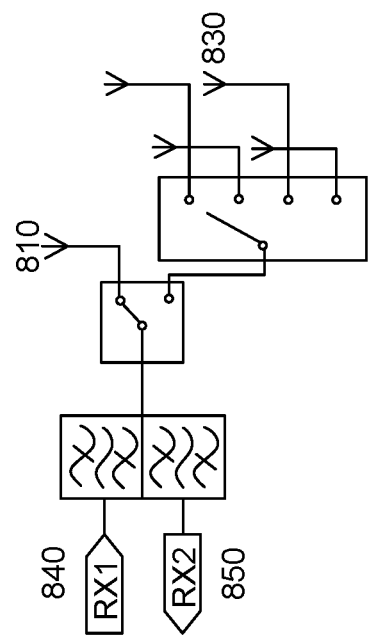

FIG. 8G illustrates an exemplary embodiment that further develops the exemplary embodiments of the FIGS. 8B and 8D by combining them, which allows separate directional gain, for example 5 directions, that enables the transmitter to utilize the sectorized antennas, if such are implemented with exceptional gain levels such as 20 dBi. It is to be noted that replacing the diplexer with a switch allows TDD operation.

In general, the exemplary embodiments described above may be achieved by having a switchable antenna structure for a terminal device in an NTN. The switchable antenna structure may switch between a link antenna and a monitoring antenna. In some exemplary embodiment, the implementation may allow transmission in any angle, while in some other exemplary embodiments, the implementation allows just receiving operation past the angular operation of the link antenna. The antenna orientation is secured as described above and pathloss is continuously estimated in view of the transmission link capabilities. One or more algorithms may be used to determine when the strength is sufficient to reach an access node comprised in a satellite and then allow a link antenna to be used. As described above, various radio architectures may be utilized to adapt the choice of antenna to be used. In some exemplary embodiment, there may be a second receiver chain using the monitoring antenna. This may have an advantage in cell search and handover, as the next satellite information can be received in parallel.

A benefit achieved by the exemplary embodiments above is combining existing antenna methodology with the environment in which the antennas serve, while considering the predictability in location of the satellite of the communication system. As this location varies over time the invention combines the antenna, mode of operation and choice of hardware design in a way that makes the design gain advantages in link stability and power savings.

Figure 9:
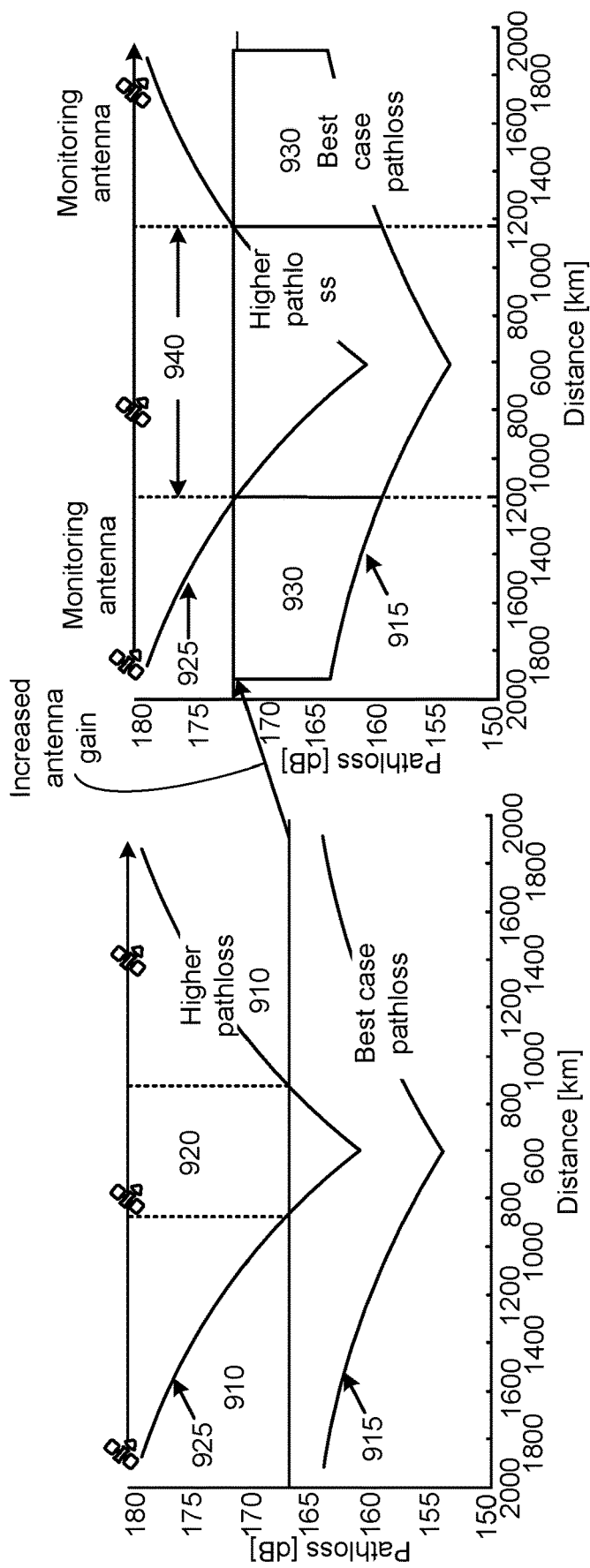
FIG. 9 and FIG. 10 illustrate graphs describing exemplary embodiments.

FIG. 9 illustrates a benefit of having directional gain projected onto pathloss curves relative to the satellite distance in an exemplary embodiment. The graph 902 illustrates an omni-directional antenna. As can be seen, the omni-directional antenna has less gain than when a link antenna and a monitoring antenna are used as is illustrated by the graph 904. Line 915 illustrates a best case pathloss and line 925 illustrates a higher pathloss. Area 920 illustrates when the TX uplink can reach the satellite and area 910 when it cannot. Area 930 illustrates when there is only receiving of signals and area 940 illustrates when there is also transmission from the terminal device. In the exemplary embodiment of FIG. 10, TX is on one or more monitoring antennas until pathloss exceeds the reach of the TX power. The best case pathloss is illustrated by 1015 and the higher pathloss is illustrated by 1025. Area 1030 illustrates when TX is on the one or more monitoring antennas and area 1040 illustrates when a link antenna is used. Areas 1010 illustrate when TX is stopped on the one or more monitoring antennas.

Figure 10:
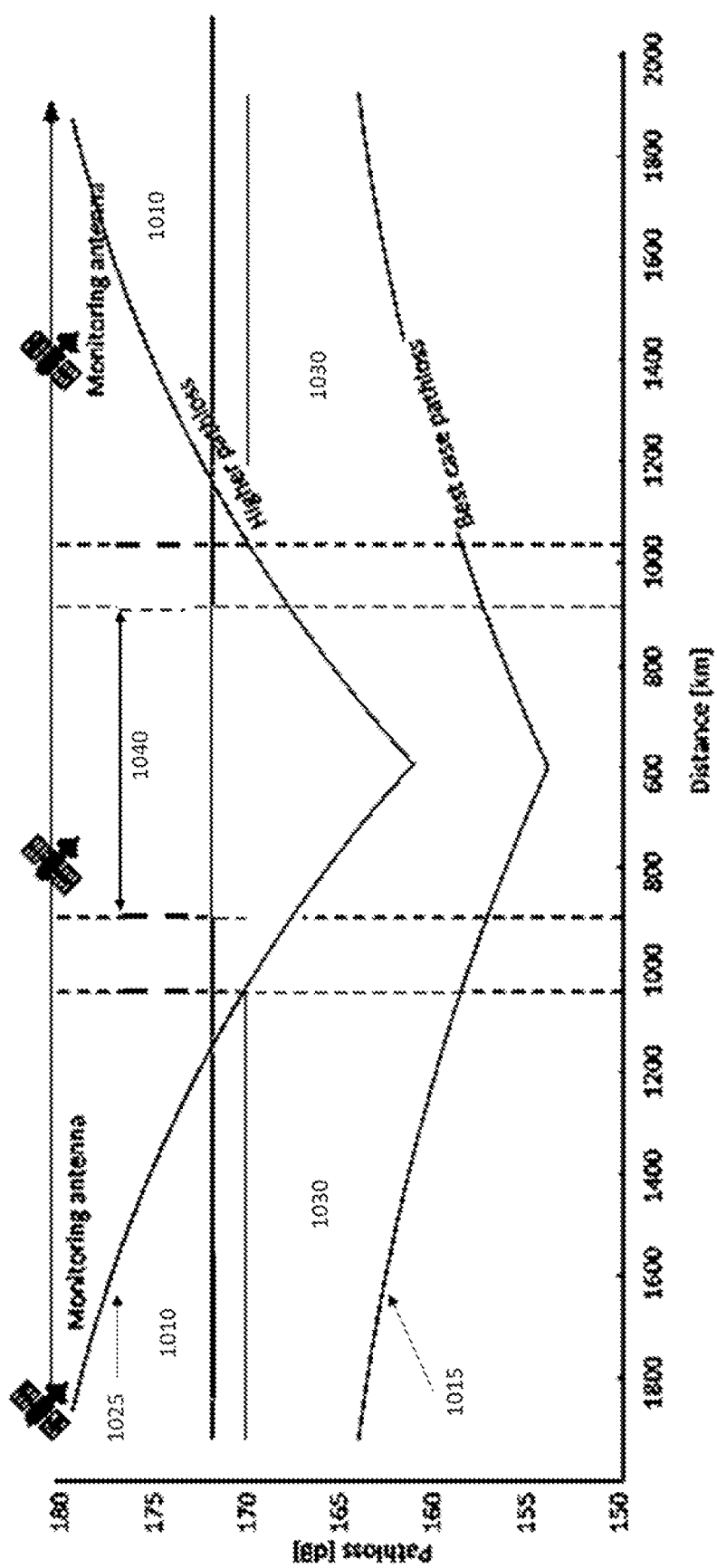

Since a link antenna is limited in angular operation to achieve the higher gain, as described in the radio architectures of FIGS. 8A, 8B and 8D a transmitter on the monitoring antenna may be supported. FIG. 10 illustrates an example of how this operation would perform.

As described in the exemplary embodiments above, the terminal device may utilize available knowledge regarding its own position on Earth and the current positions and trajectories of one or more satellites. This may be achieved, for example, by using Global Navigation Satellite System, GNSS, capabilities, enabling the terminal device to determine its own location on Earth. Also, the terminal device may be expected to have satellite ephemeris data, which defines the satellite constellation parameters comprising satellite locations and trajectories at any given time. By combining the knowledge of the location of the terminal device and the satellite's location and movement, the terminal device may determine when to activate the monitoring antenna, in order to receive system information from future neighbour cells. It is to be noted that the exemplary embodiments described above may be applicable to various carrier frequencies and bandwidths. Thus, the exemplary embodiments are also applicable to, for example, ultra wideband applications. Although the carrier frequency and bandwidth used in a certain implementation may affect the type of antennas used in that implementation, the exemplary embodiment described above are applicable to various types of antennas and thus may be utilized with various carrier frequencies and bandwidths.

Figure 11:
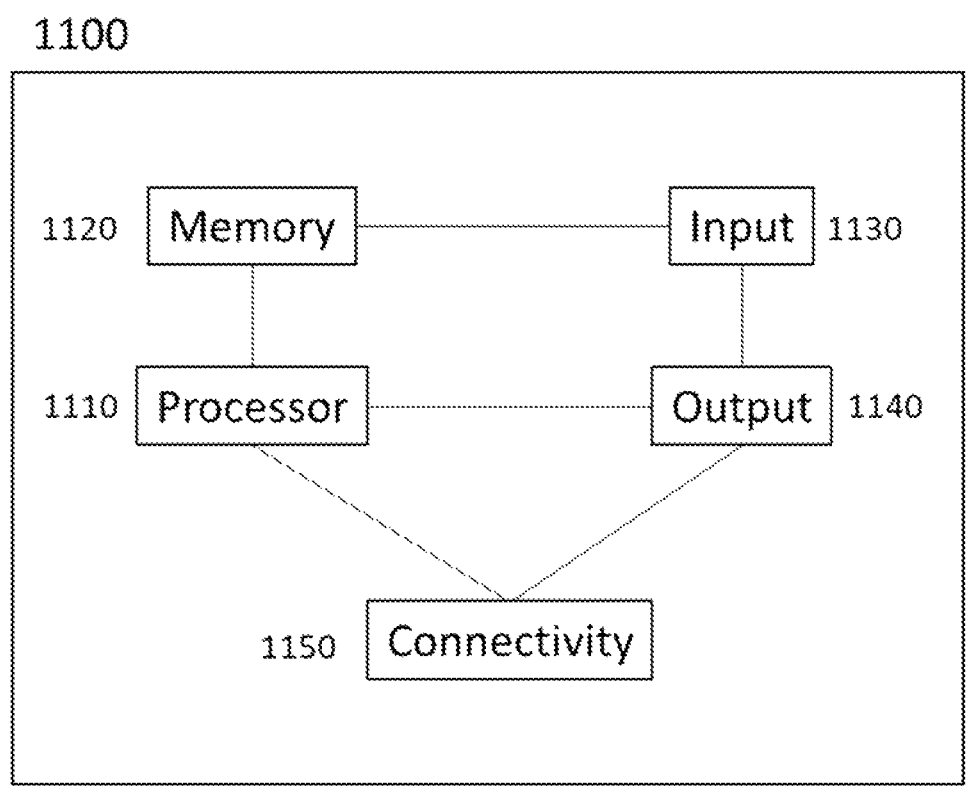
FIG. 11 illustrates an exemplary embodiment of an apparatus.

FIG. 11 illustrates an apparatus 1100, which may be an apparatus such as, or comprised in, a terminal device, according to an example embodiment. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application specific integrated circuits, ASICs.

The processor 1110 is coupled to a memory 1120. The processor is configured to read and write data to and from the memory 1120. The memory 1120 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1120 stores computer readable instructions that are execute by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via electromagnetic carrier signal and/or may be copied from a physical entity such as computer program product. Execution of the computer readable instructions causes the apparatus 1100 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1100 further comprises, or is connected to, an input unit 1130. The input unit 1130 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 1130 may comprise an interface to which external devices may connect to.

The apparatus 1100 also comprises an output unit 1140. The output unit comprises or is connected to one or more displays capable of rendering visual content such as a light emitting diode, LED, display, a liquid crystal display, LCD and a liquid crystal on silicon, LCoS, display. The output unit 1140 further comprises one or more audio outputs. The one or more audio outputs may be for example loudspeakers or a set of headphones.

The apparatus 1100 may further comprise a connectivity unit 1150. The connectivity unit 1150 enables wired and/or wireless connectivity to external networks. The connectivity unit 1150 may comprise one or more antennas and one or more receivers that may be integrated to the apparatus 1100 or the apparatus 1100 may be connected to. The connectivity unit 1150 may comprise an integrated circuit or a set of integrated circuits that provide the wireless communication capability for the apparatus 1100. Alternatively, the wireless connectivity may be a hardwired application specific integrated circuit, ASIC.

It is to be noted that the apparatus 1100 may further comprise various component not illustrated in the FIG. 11. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:
provide orientation of a first type of an antenna and a second type of an antenna, wherein the first type of an antenna and the second type of an antenna are comprised in a terminal device, wherein the first type of antenna and the second type of antenna have different radiation patterns for communicating with a cell provided by an access node provided in a satellite or relayed through a satellite;
determine whether the terminal device is radio resource control connected to a cell provided by an access node comprised, at least partly, in a satellite or relayed through the satellite, and upon determining it is;
estimate a link loss based, at least partly, on downlink receive measurements obtained using the first type of an antenna;
determine an uplink link budget based on the estimated link loss;
determine whether the uplink link budget is greater than a threshold for a transmit antenna, wherein the transmit antenna is the first type of the antenna or the second type of an antenna; and
attempt a transmission to the access node using the transmit antenna upon determining that the uplink link budget is greater than the threshold for the transmission antenna.

2. The apparatus according to claim 1, wherein if it is determined that the terminal device is not radio resource connected to the cell, the apparatus is further caused to search for any suitable cell using the first type of an antenna.

3. The apparatus according to claim 1, wherein the uplink link budget is determined further based on available transmit power, power class and selection of one of the first type of an antenna and the second type of an antenna.

4. The apparatus according to claim 1, wherein if it is determined that the uplink budget is not greater than the threshold for the transmit antenna, the apparatus is further caused to calculate transmit inactive time and remain in receive monitoring state for a duration of the transmit inactive time.

5. The apparatus according to claim 1, wherein the apparatus may be further caused to obtain a location of the terminal device and an ephemeris of the satellite.

6. The apparatus according to claim 5, wherein the apparatus is further caused to activate the first type of an antenna based on the obtained location of the terminal device and the ephemeris of the satellite or the ephemeris of the satellite and an ephemeris of at least one other satellite.

7. The apparatus according to claim 5, wherein the apparatus is further caused to verify the estimated link loss based on the obtained location of the terminal device and the ephemeris of the satellite.

8. The apparatus according to claim 1, wherein the terminal device comprises at least one switch that switches a transmit and/or a receive path between the first type of an antenna and the second type of an antenna.

9. The apparatus according to claim 8, wherein the terminal device comprises plurality of receivers with respective receive paths connecting the receivers to the first or the second type of the antenna.

10. The apparatus according to claim 9, wherein the terminal device further comprises a plurality of first type of antennas.

11. The apparatus according to claim 1, wherein the apparatus is further caused to optimize uplink transmission based on energy required by one or more segments of a transmission window.

12. The apparatus according to claim 1, wherein the apparatus is further caused to use the first type of the antenna for searching, measuring and/or obtaining system information for one or more neighbor cells at least partly simultaneously with the apparatus being caused to use the second type of the antenna for communication with the radio resource connection connected cell.

13. The apparatus according to claim 1, wherein the apparatus is comprised in the terminal device.

14. A method comprising:
providing orientation of a first type of an antenna and a second type of an antenna, wherein the first type of an antenna and the second type of an antenna are comprised in a terminal device, wherein the first type of antenna and the second type of antenna have different radiation patterns for communicating with a cell provided by an access node provided in a satellite or relayed through a satellite;

determining whether the terminal device is radio resource control connected to a cell provided by an access node comprised, at least partly, in a satellite or relayed through the satellite, and upon determining it is;

estimating a link loss based, at least partly, on downlink receive measurements obtained using the first type of an antenna;

determining an uplink link budget based on the estimated link loss;

determining whether the uplink link budget is greater than a threshold for a transmit antenna, wherein the transmit antenna is the first type of the antenna or the second type of an antenna; and attempting a transmission to the access node using the transmit antenna upon determining that the uplink link budget is greater than the threshold for the transmission antenna.

15. The method according to claim 14, further comprising:

searching for any suitable cell using the first type of an antenna if it is determined that the terminal device is not radio resource connected to the cell.

16. The method according to claim 14, wherein the determining an uplink link budget comprises:

determining an uplink link budget based on available transmit power, power class and selection of one of the first type of an antenna and the second type of an antenna.

17. The method according to claim 14, further comprising:

calculating a transmit inactive time and remaining in a receive monitoring state for a duration of the transmit inactive time if it is determined that the uplink link budget is not greater than the threshold for the transmit antenna.

18. The method according to claim 14, further comprising:

obtaining a location of the terminal device and an ephemeris of the satellite.

19. The method according to claim 18, further comprising:

activating the first type of an antenna based on the obtained location of the terminal device and the ephemeris of the satellite or the ephemeris of the satellite and an ephemeris of at least one other satellite.

20. The method according to claim 18, further comprising:

verifying the estimated link loss based on the obtained location of the terminal device and the ephemeris of the satellite.

\* \* \* \* \*